United States Patent [19]
Shih

[11] 3,888,949
[45] June 10, 1975

[54] BLENDS OF PROPYLENE-ALPHA-OLEFIN COPOLYMERS AND POLYPROPYLENE

[75] Inventor: Chi-kai Shih, Wilmington, Del.

[73] Assignee: E. I. du Pont de Nemours & Co., Wilmington, Del.

[22] Filed: June 21, 1973

[21] Appl. No.: 372,048

[52] U.S. Cl...... 260/897 A; 260/88.2 F; 260/876 B; 260/876 R; 260/878 B
[51] Int. Cl. ............................................. C08f 37/18
[58] Field of Search ............. 260/876 B, 878 B, 897

[56] References Cited
UNITED STATES PATENTS

| | | | |
|---|---|---|---|
| 3,262,992 | 7/1966 | Holzer et al. | 260/876 |
| 3,354,239 | 11/1967 | Short | 260/876 |
| 3,632,674 | 1/1972 | Aishima et al. | 260/876 B |

FOREIGN PATENTS OR APPLICATIONS

| | | | |
|---|---|---|---|
| 1,059,978 | 2/1967 | United Kingdom | 260/878 |

Primary Examiner—Murray Tillman
Assistant Examiner—C. J. Seccuro

[57] ABSTRACT

Blends of stereoregular propylene-$\alpha$-olefin copolymers and polypropylene of similar stereoregularity characterized by melting and crystallization behavior characteristic of the stereoregular propylene sequences as well as improved injection molding characteristics.

5 Claims, No Drawings

BLENDS OF PROPYLENE-ALPHA-OLEFIN COPOLYMERS AND POLYPROPYLENE

BACKGROUND OF THE INVENTION

A continuing industrial demand exists for a polymeric material which has improved processing characteristics. A particularly desirable copolymer of this type which can be produced at relatively low cost has recently been discovered and is described in detail in the copending, coassigned now abandoned U.S. Pat. application of Fritz and Su, Ser. No. 281,942, hereby incorporated by reference. These random polymers can be prepared by the simultaneous copolymerization of propylene and hexene-1 in the presence of a specific class of catalysts and cocatalysts.

While the propylene-α-olefin copolymers exhibit an exceptional combination of properties, the method of copolymerization results in the formation of a random, statistical copolymer. The broad range of monomer sequence lengths in the copolymer results in a relatively broad range of the melting point. This in turn presents some difficulty in processing the copolymer after formation. For example, in injection molding the polymer, a high degree of orientation is imparted. This limits the adaptability and range of uses for the copolymer and, in combination with the low melting fractions of the copolymer composition, depreciates the long term dimensional stability of injection molded articles. The processing of the copolymers is further complicated by some of the lower molecular weight fractions of the composition exuding out, fouling processing equipment and complicating handling.

Various solutions have been proposed to alleviate these problems. For example, the random copolymer composition can be purified to eliminate the low melting fractions. Alternatively, a block copolymer, as opposed to a random copolymer, can be prepared by alternating monomer feeds so as to carefully structure a copolymer. However, such procedures involve costly and burdensome process steps to achieve the desired results.

SUMMARY OF THE INVENTION

The present invention provides blends of polypropylene and propylene/higher α-olefin copolymers that retain the desirable thermoplastic elastomeric characteristics of these copolymers while eliminating the deficiencies previously encountered.

Specifically, the instant invention provides intimate polymer blends comprising a. a random thermoplastic elastomeric copolymer of propylene and at least one α-olefin having from 6 to 20 carbon atoms, the copolymer having stereoregular crystalline polypropylene sequences and amorphous sequences, about from 10 to 50 weight percent of the copolymer being derived from the α-olefin, the remainder being derived from propylene, the copolymer having a melt index of about from 0.01 to 200 g./10 min. under a 2,160 g. load at 190°C. and a crystallinity number of about from 40 to 70; and b. about from 5 to 95% by weight of the copolymer blend, of polymer having at least one melting transition above 155°C. and which consists essentially of substantially stereoregular polypropylene of the same type of stereoregularity as copolymer (a).

DETAILED DESCRIPTION OF THE INVENTION

The thermoplastic elastomeric copolymers which form a basic component of the present copolymer blends are random statistical stereoregular copolymers of propylene and at least one higher α-olefin having from 6 to 20 carbon atoms. The copolymers exhibit certain crystallinity characteristics that result in their unique physical properties. A detailed description of the preparation of proylene/hexene-1 copolymers of this type is found in the copending Fritz and Su application previously referred to. A detailed description of the preparation of copolymers of this type from propylene and higher α-olefins having from 7 to 20 carbon atoms is described in detail in the copending, coassigned (now abandoned) patent application of Fritz, Ser. No. 349,703 filed Apr. 10, 1973, also hereby incorporated by reference.

In addition to those copolymers specifically described in the copending applications, the polymer blends of the instant invention permit the use of propylene/higher α-olefin copolymers that have block characteristics. As used in connection with the thermoplastic elastomeric copolymers used in the instant blends, the term "block" refers to a copolymer segment of propylene and a higher α-olefin of from 6 to 20 carbon atoms which is substantially random with respect to the arrangement of the propylene and higher α-olefin, and has a molecular weight of at least about 10,000, and differs in composition from adjacent polymer chain segments. Block propylene/higher α-olefins of this type can be prepared using the same processing techniques described in the aforementioned applications, but with alteration of the ratio of reactants in the course of the reaction. For example, removal of propylene after part of the copolymerization has occurred will leave the α-olefin which can homopolymerize until a fresh portion of propylene is added later; or greater and lesser proportions of the higher α-olefin can be introduced to vary the percentage composition of consecutive blocks of copolymer.

Polypropylene makes up 5 to 95% of the total weight of the copolymer blends of the present invention. The polypropylene used in the present blends can vary widely in form. For example, substantially isotactic polypropylene homopolymer can be used with isotactic propylene/α-olefin copolymer, or the polypropylene can be in the form of a copolymer containing less than about 10 weight percent of other monomer. Further, the polypropylene can be present in the form of a graft or block copolymer, in which the blocks of polypropylene have substantially the same stereoregularity as the propylene-α-olefin copolymer, so long as the graft or block copolymer has a sharp melting point above about 155°C. characteristic of the stereoregular propylene sequences.

The copolymer blends of the instant invention can be prepared by any procedure that guarantees the intimate admixture of the components. For example, the components can be combined by melt pressing the components together on a Carver press to a thickness of about 0.5 millimeter (20 mils) and a temperature of about 180°C, rolling up the resulting slab, folding the ends together, and repeating the pressing, rolling, and folding operation about 10 times. Internal mixers are particularly useful for solution or melt blending. Blending at a temperature of about 180°C in a Brabender Plastograph for about 20 minutes has been found satisfactory. Still another method that can be used for admixing the components involves blending the polymers in a Banbury internal mixer above the flux temperature of the polypropylene, e.g., 180°C for about 5 minutes. The complete admixture of the polymeric components is indicated by the merging of the crystallization and melting transitions characteristic of the polypropylene crystallinity of the components to give single crystallization and melting points for the blend.

The polymer blends of the instant invention exhibit a remarkable combination of desirable physical properties. The incorporation of as little as 5% polypropylene in the propylene/α-olefin copolymers increases the propylene sequence melting point or the polymer softening point but, more significantly, reduces the range, to give a sharper melting point than that of the propylene/α-olefin copolymer. In addition, the incorporation of substantially isotactic polypropylene in accordance with the instant invention nearly eliminates the stickiness caused by a fraction of the propylene/α-olefin copolymer exuding out. Further, the crystallization characteristics of the copolymer blends are markedly improved over those of the propylene/α-olefin copolymers, the crystallization temperature of the propylene sequences being raised. This permits their satisfactory use in injection molding operations without the orientation previously encountered. Injection molded articles prepared from the instant copolymer blends accordingly exhibit excellent long term dimensional stability. The advantages referred to above are obtained without the need for elaborate purification of the propylene/α-olefin copolymer or the tedious preparation of a carefully structured block copolymer.

Through the use of the "block" copolymers having alternating sequences of dissimilar α-olefin content, a copolymer can be obtained with a lower glass transition temperature as compared to a random copolymer of the same composition. At the same time, this can be accomplished without an exceptionally high α-olefin content in the polymer as a whole.

The mechanism by which the desirable characteristics of the present copolymer blends are obtained is not fully understood. However, it is believed to involve a cocrystallization phenomenon between propylene sequences of similar stereoregularity in the various polymeric components, which results in a single crystallization temperature and a single melting temperature of the copolymer blend which is higher than those of the propylene/α-olefin component of the blend. It is surprising that the blend has a single crystallization temperature and a single melting temperature, since it would be expected by those skilled in the art that the blending of two crystalline polymers would result in a double crystallization temperature as well as a double melting temperature reflecting the two polymeric components. However, the intimate blending of the polymers having the required crystallinity characteristics apparently results in a crystallization phenomenon that modifies the other physical properties of the propylene/α-olefin copolymer, thus measurably increasing its commercial utility and range of applications.

The polymer blends within the scope of the present invention can be modified to adjust the characteristics of the blend as desired. For example, for those thermoplastic elastomers having a lower percentage of α-olefin, less polypropylene will be needed to give a comparable degree of the beneficial effects of the present blends.

As will be evident by those skilled in the art, the present polymer blends can also include fillers, plasticizers and other additives normally used in conjunction with elastomeric compositions.

The invention is further illustrated by the following specific examples.

In the examples, the melting point and crystallization temperature are determined by first heating a 10–20 mg sample, in a crimped aluminum pan, to 200°C and in a differential scanning colorimeter. After being held at 200°C for 3 minutes, the sample is cooled at the rate of 20°C/minute, and the crystallization temperature is observed as the onset of the exotherm. After cooling to 25°C, the sample is heated at the rate of 10°C/minute, and the melting point is observed as the minimum temperature of the endotherm.

EXAMPLES 1–9

In Examples 1–9, a random, statistical, isotactic, thermoplastic, elastomeric copolymer of propylene and 1-hexene is made with $\gamma$-$TiCl_3$ catalyst in accordance with the general teachings of copending application Fritz et al. Ser. No. 281,942. It contains 43.8 weight percent hexene monomer units and is characterized by a melt index of 0.96 g/10 min. (ASTM Method D 1238–65T, condition E at 190°C under a 2,160-g load) and a crystallinity number of 45.

Mixtures of the copolymer and polypropylene are intimately blended using a Carver press having heated platens (180°C) between which are positioned a pair of aluminum plates. A 5-gram sample of a mixture of propylene/hexene copolymer and isotactic polypropylene is placed between 0.5 mm sheets of Mylar polyester film and positioned in the press between the aluminum plates. The 10.2 cm ram of the press then applies a force of 2,270 kgs to compress the sample to a thickness of about 0.5 mm. The press is then opened, and the resulting slab of blended polymers is cooled for 30 to 60 seconds. It is then rolled and folded. The resulting specimen is returned to the press and again compressed, removed, cooled, rolled, and folded as before. The hot compression operation is done 10 times to provide an intimate blend of the polymeric components.

Table I summarizes the properties of the product obtained by melt blending various proportions of the propylene/hexene copolymer and isotactic polypropylene.

TABLE I

| Example | Wt. % Polypropylene in Blend | Melting Temperature (°C) | Crystallization Temperature (°C) |
|---|---|---|---|
| Control | 0 | 148 | 84 |
| Control | 0.99 | 148 | 93 |
| 1. | 4.8 | 149 | 93 |
| 2 | 13 | 153 | 115 |
| 3 | 23 | 157 | 117 |
| 4 | 23 | 157 | 112 |
| 5 | 29 | 158 | 122 |
| 6 | 33 | 158 | 115 |
| 7 | 50 | 157 | 112 |
| 8 | 75 | 162 | 124 |
| 9 | 90 | 162 | 120 |
| Control | 100 | 166 | 122 |

The blends of the invention exhibit sharp melting points and improved processing characteristics, and are found to be cocrystallized. The blend of Example 7 is tested for stress-strain performance and compared to the components of the blend. The characteristics are summarized in Table II.

TABLE II

| at 25°C: | PP | P/H | Example 7 |
|---|---|---|---|
| Modulus (kg/sq. cm.) | | | |
| at 100% Extension | — | 38.7 | 123 |
| 200% Extension | — | 52.7 | 127 |
| 300% Extension | — | 70.3 | 130 |
| 400% Extension | — | 87.9 | 135 |
| Tensile Strength at Break (kg/sq. cm.) | 172 | 169 | 239 |
| Extension at Break (%) | 25 | 700 | 740 |
| at 100°C: | | | |
| Modulus (kg/sq. cm.) | | | |
| at 100% Extension | 105 | 10.5 | 43.6 |
| 200% Extension | 105 | 12.3 | 42.2 |
| 300% Extension | 105 | 13.4 | 40.8 |
| Tensile Strength at Break (kg/sq. cm.) | 105 | >18.3 | 56.2 |
| Extension at Break (%) | 580 | >520 | >610 |

EXAMPLE 10

The procedure of Examples 1–9 is repeated, except that the copolymer comprises 15% hexene instead of 43.8%. A cocrystallized blend is obtained having similar physical characteristics.

EXAMPLES 11–13

A copolymer is prepared in a one-liter stainless steel pressure reactor charged with 650 ml of hexane, 1.25 gram-moles of propylene, 0.93 gram-moles of 1-octene, 0.0135 gram-mole of diethylaluminum chloride, and 0.0016 gram-mole of triethylaluminum with the exclusion of air and moisture. The agitated mixture is heated and 0.005 gram-moles of $(TiCl_3)_3 \cdot AlCl_3$ are introduced. The copolymerization, which follows, is carried out with vigorous stirring at 7.0 kg/sq. cm (gauge) declining to 3.5 kg/sq. cm (gauge).

The catalyst is deactivated by addition of isopropanol; then excess propylene is vented. The copolymer slurry is filtered and washed with isopropanol and then with acetone. After drying the product weighs 135 grams. This random, statistical, isotactic, elastomeric thermoplastic copolymer contains 45 weight percent 1-octene monomer units, has a crystallinity number of 40, and exhibits a melt index of 60 g/10 min. (ASTM Method D 1238–65T, condition E at 190°C under a 2,160-g load). Its Tg is −47°C and its brittle point is −45°C.

The propylene/1-octene copolymer is melt blended with isotactic polypropylene in accordance with the general procedure of Examples 1–9. The resulting intimately blended compositions are found to be cocrystallized and and exhibit the properties summarized in Table III.

TABLE III

| Example | Wt. % Polypropylene in Blend | Melting Temperature (°C) | Crystallization Temperature (°C) |
|---|---|---|---|
| Control | 0 | 155 | 95 |
| 11 | 13 | 155 | 108 |
| 12 | 23 | 157 | 116 |
| 13 | 50 | 158 | 117 |
| Control | 100 | 166 | 122 |

EXAMPLE 14

The general procedure of Examples 1–9 is repeated, except that in place of isotactic homopolypropylene a propylene graft copolymer commercially available as "TPR–019" from Uniroyal Inc. is employed. The melt index (ASTM Method D1238–65T, condition E at 190° under a 2,160-g load) is less than 0.01 g/10 min., and the crystallinity number is 67. This copolymer has hard segments (formed from isotactic polyproylene) joined to soft segments containing ethylene/propylene sequences.

The intimate blend resulting from the combination of the graft propylene/ethylene copolymer and the random propylene/hexene copolymer is found to be cocrystallized, and exhibits the physical properties summarized in Table IV.

TABLE IV

| Example | Wt. % Propylene Graph Copolymer in Blend | Melting Temperature (°C) | Crystallization Temperature (°C) |
|---|---|---|---|
| Control | 0 | 148 | 84 |
| 14 | 50 | 158 | 112 |
| Control | 100 | 162 | 122 |

The copolymer blend is compared in physical characteristics with the components of the blends. The results are tabulated below.

TABLE V

| At 25°C:[1] | P Graph Cop. | P/H | 1:1 Blend |
|---|---|---|---|
| Modulus (kg/sq. cm.) | | | |
| at 100% Extension | 98.4 | 38.7 | 49.2 |
| 200% Extension | 104 | 52.7 | 59.8 |
| 300% Extension | 107 | 70.3 | 71.9 |
| 400% Extension | — | 87.9 | 87.9 |
| Tensile Strength at Break (kg/sq. cm.) | 107 | 169 | 127 |
| Extension at Break | 300 | 700 | 600 |
| At 100°C:[1] | | | |
| Modulus (kg/sq. cm.) | | | |
| at 100% Extension | 43.6 | 10.5 | 16.9 |
| 200% Extension | 47.8 | 12.3 | 18.3 |
| 300% Extension | 47.1 | 13.4 | 19.7 |
| Tensile Strength at Break (kg/sq. cm.) | 47.1 | >18.3 | >29.6 |
| Extension at Break | 300 | >520 | >520 |

[1] ASTM D412

EXAMPLES 15–20

A propylene/dodecene block copolymer is prepared in a 11.36-liter stainless steel reactor having an agitator and provision for maintenance of a protective nitrogen atmosphere.

This reactor is charged at 25°C with 2 kg. of propylene, 3 liters of hexane, 4 liters of 1-dodecene, 0.09 gram-mole of diethylaluminum monochloride and 0.03 gram-mole of triethylaluminum. Heat is applied. When the temperature reaches 60°C, hydrogen (0.07 kg/sq. cm gauge) is introduced, followed by injection of 0.04 gram-mole of $(TiCl_3)_3 \cdot AlCl_3$. Copolymerization of propylene and 1-dodecene follows for 1 hour at 60°C.

The pressure is released and the reaction mixture is purged with nitrogen to remove unreacted propylene. Homopolymerization of some of the residual 1-dodecene occurs for the next hour at 60°C to form a block of poly(1-dodecene) attached to the random, statistical isotactic copolymer of propylene and 1-dodecene formed during the first hour.

More propylene is introduced until the pressure at 60°C is the same as it was just before the dodecene polymerization took place. The mixture is kept at 60°C for another hour. A terminal block of random, statistical isotactic copolymer of propylene and 1-dodecene is formed attached to the polydodecene formed during the second hour.

The catalyst is then deactivated by addition of 250 ml of isopropanol. When cool, the slurry reaction mixture is removed and dumped into isopropanol in a blender for washing; acetone is used for the final washing.

The block copolymer thus prepared has the following structure:

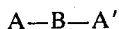

A—B—A′ where A and A′ are random, statistical, isotactic propylene/1-dodecene sequences and B is a 1-dodecene sequence. The overall 1-dodecene content is 12.5 weight percent. The melt index is 3.3 g/10 min. (ASTM Method D1238–65T, condition E at 190°C. under a 2,160-g load) the crystallinity number is 70. The copolymer displays the following properties at 25°C.: modulus at 100% extension [87.9 kg/sq. cm.]; modulus at 200% estension, [91.4 kg/sq. cm.]; modulus at 300% extension, [98.4 kg/sq. cm]; tensile strength at break, [190 kg/sq. cm.]; extension at break, 640%; Shore D hardness, 50; Bashore resilience, 42.

The propylene/dodecene block copolymer and varying amounts of the isotactic polypropylene of the type used in Example 1 are added simultaneously to an electrically heated 50 cc Brabender Plastograph internal mixer operated at 75 rpm. After melt blending has occurred for 10 minutes at 180°C, the mixer is opened and cooling water is passed through its jacket. About a minute later the resulting blend is removed.

Table VI, which follows, displays typical D.S.C. data for the blends.

TABLE VI

| Example | Wt. % Polypropylene in Blend | Melting Temperature (°C) | Crystallization Temperature (°C) |
|---|---|---|---|
| Control | 0 | 153 | 98 |
| 15 | 5 | 150 | 102 |
| 16 | 10 | 150 | 102 |
| 17 | 15 | 152 | 105 |
| 18 | 25 | 157 | 113 |
| 19 | 33 | 155 | 109 |
| 20 | 50 | 158 | 110 |
| Control | 100 | 166 | 122 |

The melting and crystallization temperature characteristics of the components have disappeared from the DSC curves for the blends.

EXAMPLES 21–25

A continuous 30.2-liter reactor is operated at 50°C. and a pressure of 4.92 kg.sq. cm. with a residence time of 50 minutes. The following flow rates are established at steady-state:

| | per minute |
|---|---|
| propylene | 1.1 moles |
| hexene | 0.8 mole |
| hydrogen | 125 cc. |
| $(TiCl_3)_3 \cdot AlCl_3$ | 0.8 milli mole |
| diethyl AlCl | 3 milli moles |
| hexane | 435 cc. |

Propylene/hexene copolymer is formed continuously and recovered from the effluent at the rate of 20 grams/min. The product is isolated by deactivating the catalyst with isopropanol, treating the copolymer with HCl and isopropanol and drying the washed copolymer in a vacuum oven. The isolated product has 36 wt. % hexene, its melt index is 6.0 grams/10 min. (at 190°C. under a 2,160-g load; ASTM Method D 1238–65%, Condition E), and its crystallinity number is 44.

The resulting random elastomeric thermoplastic propylene/hexene copolymer is mixed with isotactic polypropylene. A Brabender Plastograph is employed having a small electrically heated chamber with two confoluted rollers capable of shear-mixing and masticating polymer at a selected high temperature. The Plastograph is operated at 75 rpm and 180°C. to mix the components; after 10-minutes mixing, the machine is opened, cooled for one minute, and unloaded. The compositions of the resulting intimate blends are given in Table VII.

Flexural modulus bars 12.7 mm × 3.175 mm × 127.0 mm (½ × ⅛ × 5 inches) are formed by injection molding. Two notched Izod impact slabs, 12.7 mm × 3.175 mm × 50.8 mm (½ × ⅛ × 2 inches), are cut from each bar. In each case a sample of a blend is put in a piston-operated 28.3 g. injection molding machine having a reservoir at 190°C.; and is injected under a pressure reaching a maximum of 14.1 kg/sq. cm. over a 20-second period into a mold and held for an additional 20 seconds. The mold is set at 40°C.

The bars made from the intimate blends of this invention display no strain pattern when inspected for orientation between two crossed polarizer; in contrast, the propylene/hexene copolymer itself displays a noticeable strain pattern. Izod impact test results (ASTM Method D-256) are given in Table VII below. The impact strength of polypropylene is improved in proportion to the % P/H added to the blend.

TABLE VII

| Example | Blend Composition | | Izod Impact |
|---|---|---|---|
| | % PP | % P/H | (joules/meter) |
| Control | 100 | 0 | 21 |
| 21 | 90 | 10 | 48 |
| 22 | 75 | 25 | 69 |
| 23 | 50 | 50 | 690 |
| 24 | 23 | 77 | not det'd |
| 25 | 13 | 87 | not det'd |
| Control | 0 | 100 | not det'd |

The injection molding is repeated to produce fluxural modulus bars of half as thick as those above. The strain pattern of the propylene/hexene copolymer is again noticeable but that of the blends displays a reduced intensity proportional to the polypropylene content in the blend.

I claim:
1. An intimate polymer blend comprising
   a. thermoplastic elastomeric copolymer of propylene and at least one α-olefin having from 6 to 20 carbon atoms, the copolymer having stereoregular crystalline sequences and amorphous sequences, about from 10 to 50 weight percent of the copolymer being derived from the α-olefin, the remainder being derived from propylene, the copolymer having a melt index of about from 0.01 to 200 at 190°C and a crystallinity number of about from 40 to 70; and
   b. about from 5 to 95%, by weight of the copolymer blend, of polymer having at least one melting transition above 155°C and which consists essentially of substantially stereoregular polypropylene, said polymeric components (a) and (b) having propylene sequences of similar stereoregularity.

2. A polymer blend of claim 1 wherein the α-olefin of the copolymer consists essentially of hexene-1.

3. A copolymer blend of claim 1 where the α-olefin component of the copolymer consists essentially of dodecene.

4. A polymer blend of claim 1 wherein component (b) consists essentially of substantially isotactic propylene homopolymer.

5. A polymer blend of claim 1 wherein said blend has a single melting temperature, components (a) and (b) are in a co-crystallized state, and component (a) is a random copolymer.

* * * * *